(12) United States Patent
Deroos et al.

(10) Patent No.: US 9,618,934 B2
(45) Date of Patent: Apr. 11, 2017

(54) UNMANNED AERIAL VEHICLE 3D MAPPING SYSTEM

(71) Applicant: 4D TECH SOLUTIONS, INC., Morgantown, WV (US)

(72) Inventors: Bradley G. Deroos, Fairmount, WV (US); Kirill Speransky, Morgantown, WV (US); Marcela Alexandra Mera Trujillo, Popayan (CO)

(73) Assignee: 4D TECH SOLUTIONS, INC., Morgantown, WV (US)

( * ) Notice: Subject to any disclaimer, the term of this patent is extended or adjusted under 35 U.S.C. 154(b) by 0 days.

(21) Appl. No.: 14/853,611

(22) Filed: Sep. 14, 2015

(65) Prior Publication Data
US 2016/0202695 A1    Jul. 14, 2016

Related U.S. Application Data

(60) Provisional application No. 62/049,622, filed on Sep. 12, 2014.

(51) Int. Cl.
| | |
|---|---|
| *G05D 1/00* | (2006.01) |
| *B64C 39/02* | (2006.01) |
| *B64D 47/08* | (2006.01) |
| *G08G 5/00* | (2006.01) |
| *G05D 1/10* | (2006.01) |
| *G01C 21/02* | (2006.01) |

(52) U.S. Cl.
CPC .......... *G05D 1/0011* (2013.01); *B64C 39/024* (2013.01); *B64D 47/08* (2013.01); *G01C 21/02* (2013.01); *G05D 1/101* (2013.01); *G08G 5/0034* (2013.01); *G08G 5/0069* (2013.01); *G08G 5/0086* (2013.01); *B64C 2201/123* (2013.01)

(58) Field of Classification Search
CPC .... G05D 1/0011; G05D 1/101; B64C 39/024; B64C 2201/123; B64D 47/08; G08G 5/0034
USPC .......................................... 701/2, 3, 13, 120
See application file for complete search history.

(56) References Cited

U.S. PATENT DOCUMENTS

| | | | | |
|---|---|---|---|---|
| 2010/0131121 | A1* | 5/2010 | Gerlock | G08G 5/0013 701/2 |
| 2015/0066248 | A1* | 3/2015 | Arbeit | G01C 21/20 701/2 |
| 2015/0160658 | A1* | 6/2015 | Reedman | G05D 1/102 701/3 |
| 2016/0050840 | A1* | 2/2016 | Sauder | A01B 79/005 701/3 |

(Continued)

*Primary Examiner* — Thomas Tarcza
*Assistant Examiner* — Luke Huynh
(74) *Attorney, Agent, or Firm* — Birch, Stewart, Kolasch & Birch, LLP

(57) ABSTRACT

An automatic unmanned aerial vehicle (UAV) flight control system for 3D aerial mapping includes a UAV with an onboard camera, and a controller capable of communication with a flight control module of the UAV. The controller is configured to determine an area mapping flight path based on terrain characteristics of an area to be mapped. The controller also can determine a structure mapping flight path based on the existence and location of vertical structures within the area to be mapped. The area mapping flight path can be appended with the structure mapping flight path, thus providing an integrated and optimized UAV flight path for 3D mapping and modeling.

17 Claims, 3 Drawing Sheets

(56) References Cited

U.S. PATENT DOCUMENTS

2016/0068267 A1\* 3/2016 Liu ...................... B64C 39/024
  701/11

\* cited by examiner

UNMANNED AERIAL VEHICLE 3D MAPPING SYSTEM

CROSS REFERENCE TO RELATED APPLICATIONS

This application claims the benefit of U.S. provisional application No. 62/049,622, filed Sep. 12, 2014, the contents of which are incorporated herein by reference.

FIELD OF INVENTION

The present application relates to data processing for vehicles, navigation, and relative location, and more specifically to flight plans for unmanned aerial vehicles.

BACKGROUND

Unmanned aerial vehicles (UAVs) are remotely piloted or self-piloted aircraft that can carry sensors, communications equipment, or other payloads. They have been used in a reconnaissance and intelligence-gathering role for many years. More recently, UAVs have been developed and used for mapping and modeling functions.

Typically, UAVs use a Global Positioning System (GPS) to provide navigation over various terrains. For mapping and modeling, UAVs can be equipped with high resolution cameras, which allow UAVs so-equipped to acquire photos cost efficiently and autonomously from unconventional viewpoints. While UAV technology is advancing rapidly, UAVs are constrained by payload and flight time. To fully exploit UAVs for mapping and modeling, the limited flight-time must be accounted for and an efficient flight path must be utilized.

The challenge of limited UAV flight time is compounded by the requirement of proper photographic coverage to allow proper mapping and modeling. For "easy terrain," 75% frontal and 50% side overlap photographic coverage is recommended. For "difficult terrain," 85% frontal with 60% side overlap is recommended. For simple building mapping, oblique photos taken at different altitudes while flying around the building produce acceptable imaging results.

One method for generating solid models of high accuracy suggests that upon determining an initial movement path based on an estimate of a structure to be modeled, images of the structure to be modeled may be captured and surface hypotheses formed for unobserved surfaces based on the captured images. A normal vector and a viewing cone may be computed for each hypothesized surface. A set of desired locations may be determined based on the viewing cones for the entire structure to be modeled and a least impact path for the UAV determined based on the desired locations and desired flight parameters.

While preferred photographic coverage is known and suggested, optimal UAV flight patterns are not. For open terrain a "lawnmower-style" mapping route adjusted for the Earth's contour may be preferred. The lawnmower-style route must be adjusted when the area to be mapped contains "difficult terrain," manmade objects, vertical obstructions, and/or no-fly zones.

SUMMARY

There is a need in the industry for a system that generates an optimal UAV flight plan taking into account the desired photographic coverage and the topographical and other physical constraints of the area to be mapped.

The present invention solves the foregoing problems by providing an automatic unmanned aerial vehicle (UAV) flight control system for 3D aerial mapping that includes a UAV with an onboard camera, and a controller capable of communication with a flight control module of the UAV. The controller is configured to determine an area mapping flight path based on terrain characteristics of an area to be mapped. The controller also can determine a structure mapping flight path based on the existence and location of vertical structures within the area to be mapped. The area mapping flight path can be appended with the structure mapping flight path, thus providing an integrated and optimized UAV flight path for 3D mapping and modeling.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

EMBODIMENTS OF THE INVENTION

Figure 1:
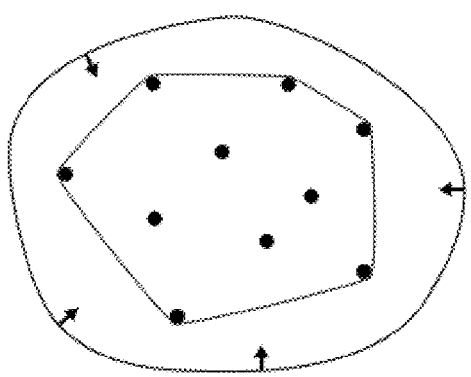
FIG. 1 illustrates a convex hull of all black points in the figure. The outer curve depicts a rubber band that is let go around the black points (pins) to form the convex hull.

The present invention solves the foregoing problems by providing an enhanced 3D mapping and modeling system that provides high-resolution, high-quality images independent of terrain, natural features, and manmade features, e.g., buildings, physical structures. For purposes of describing the present invention, the terms "mapping" and "modeling" are used interchangeably herein. Current mapping solutions primarily map objects using a classical lawnmower flight pattern during which aerial images are taken with specified frontal and side overlap of images. Distortion in 3D maps can occur when a "lawnmower" mapping flight plan is followed. There often is very little detail in the buildings' features and the vertical walls on the buildings appear to be slanted.

One aspect of the invention is a method for generating a UAV flight plan for an area to be mapped, including identifying the area to be mapped; identifying special regions within the area to be mapped; and applying a rule set for generating an optimized flight plan. Different specified regions within the area to be mapped may have their own optimal flight patterns. The optimal flight patterns from the different regions of the area to be mapped are integrated to generate an optimized flight plan for the entire area to be mapped. For example, once flight planning optimization is initiated, a polygon and/or rectangular grid that encompasses the polygon input by the user is first identified as an area to be mapped. Areas of the grid that fall fully outside of the polygon can be treated as avoidance areas such that the UAV does not fly in those areas. Within this polygon/rectangular area, the first step is to identify any special regions, e.g., avoidance areas, vegetation areas, buildings, cell towers, etc. An optimized flight path can be generated that will allow area coverage to occur efficiently in the "open area." In optimizing the open area flight path, vegetation is treated as an "open area" below a designated height and as an "avoidance area" above a designated height. Special mapping regions, e.g., buildings, cell towers, etc. are treated as avoidance areas.

The optimized open area coverage flight path can be determined by an optimization method. Nonlimiting examples of an optimization method can include optimal algorithms, heuristic algorithms including genetic algorithms, and hybrid algorithms. During the initial phase of the UAV flight path planning, rules are applied to regions, e.g., distance the UAV must stay away from avoidance areas, minimum height that must be maintained above vegetation, etc. After the optimized open area coverage flight path is generated, that portion of the flight plan is appended with special region mapping flight paths, e.g., buildings, cell towers, vertical structures, etc. To get the complete/integrated flight path, when the optimized open area coverage flight path encounters a special region, the path is appended with the special flight path needed to map that special region. As used herein "encounters" is defined as reaching the closest point of approach. After the special region flight path is complete, the UAV departs/returns to the optimized open area coverage mapping path.

Flight waypoints define the UAV flight path. Additional information/data critical to the mapping process is added to each waypoint, e.g., data file. The waypoints themselves are stated as latitude/longitude points, xy points in a predefined grid, etc. Waypoints are typically sensed by a Global Positioning Receiver, although other means of positioning or geolocation can be used, e.g., cell tower triangulation, direction finding, transponder networks, etc. Included at each waypoint within the path plan is the altitude, camera tilt angle, and camera heading (direction/bearing) at each point that is needed to create a 3D map/3D image.

A second aspect of the invention is an automatic unmanned aerial vehicle (UAV) flight control system for 3D aerial mapping. The system can include a UAV with an onboard camera, and a controller capable of communication with a flight control module of the UAV. The controller can be configured to (i) determine an area mapping flight path based on terrain characteristics of an area to be mapped; (ii) determine a structure mapping flight path based on the existence and location of vertical structures within the area to be mapped; and (iii) determine an optimized flight path for the UAV by integrating the area mapping flight path and the structure mapping flight path.

A third aspect of the invention is a computer-readable storage medium with instructions stored thereon to control a flight path of an unmanned aerial vehicle (UAV) based image capture system for 3D modeling. The instructions can include determining an initial movement path based on an area to be mapped, the existence of vertical structures and avoidance areas within the area to be mapped; capturing images of the area and structures to be mapped; and guiding the UAV flight path.

EXAMPLE

A genetic algorithm (GA) is a heuristic search algorithm based on the mechanics of natural selection and natural genetics. A GA can be used to find the optimal path for flying over an area with an autonomous quadcopter to gather enough camera shots at appropriate angles to develop a 3-D map or model of an area and structures in the area. The flight path must also avoid designated "no-fly" areas and, if necessary, fly above or avoid very tall vegetation (e.g. mature trees). Other approaches can include spanning-tree coverage algorithms and neural network based planning methods.

The first step in solving the problem is to choose the desired area to be mapped. This is done by selecting the corner points of the area (much like surveyors do when setting pins to mark of an area to be mapped). Once the corner points are chosen they are used to determine a convex hull, as shown in FIG. 1. A convex hull is constructed using all points chosen and finding a convex polygon that contains all the points.

Figure 2:
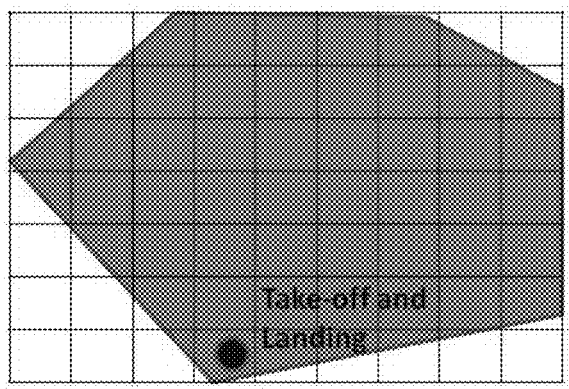
FIG. 2 illustrates the convex hull inscribed in a rectangle with a grid applied. The take-off and landing point is noted.

After the convex hull is created then the polygon is inscribed in a rectangle and a grid is applied. See FIG. 2. The latitude and longitude are maintained for each corner point for reference and a new x-y coordinate system is overlaid onto the rectangle. The initial take-off point and landing point for the quadcopter is noted.

Figure 3:
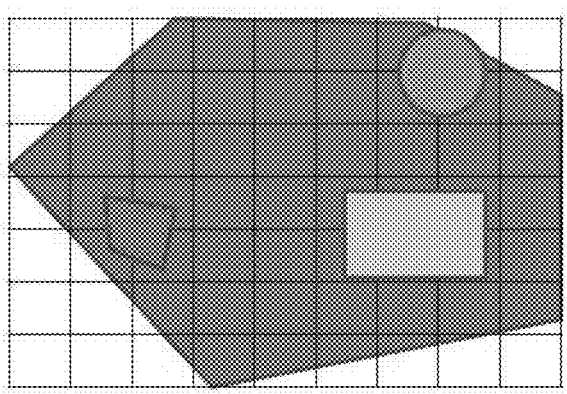
FIG. 3 illustrates avoidance areas and special areas. A building is marked with a rectangle, vegetation to fly above is marked with a circle and area of avoidance is marked with an irregular polygon.

The next step is to determine if there are areas of avoidance, vegetation to fly over, or structures to map. These areas will be noted with circles, rectangles or irregular polygons. FIG. 3 shows an area with one building marked as a rectangle, vegetation to fly above as a circle and area of avoidance as an irregular polygon.

After the areas have been determined, each of the regions in the grid is labeled with the appropriate numbers to be used in by the algorithm to determine the appropriate path of the quadcopter. Each region will be labeled with the following: 0 for open to visit; −1 is for avoidance area, either outside designated area or identified as avoid by user; −2 is for vegetation (in the case altitude being flown by the quadcopter is 100 ft then this is becomes an area of avoidance); −3 is for structures to be mapped.

When the labeling is complete, the GA is used to find an optimal path through the open regions that can be flown (details discussed below). After the GA finds an optimal path then the path around each structure is appended to the optimal area flight path.

The first step in designing a GA to solve a particular problem is to determine an encoding for an individual solution for the problem as a "chromosome." A chromosome in this case will be a 1×n matrix, where n is the length of the chromosome. For this problem, the chromosome length (n) is variable and represents the number of open cells the quadcopter visits during its flight. The reason this is variable is that there may be backtracking (revisiting open cells) during the flight and the backtracking may be different for different solutions. The objective is to have the shortest path that visits all open cells and minimizes backtracking. The Fitness Value of a chromosome is computed by the expression below:

$$\text{Fitness Value} = \begin{cases} \dfrac{\text{number of open cells}}{\text{length of the path}} & \text{for paths that visit every open cell} \\ \dfrac{\text{number of open cells}}{\text{length of path}} * 0.001 & \text{for paths that leaves open cells unvisited} \end{cases}$$

An "initial population" or set of 100 chromosomes is developed. Each chromosome is evaluated using the fitness function above to determine how it compares to the other chromosomes based on the criteria set for a good flight path (Fitness Value=1). The GA then will combine solutions using standard GA operations (crossover and mutation— discussed below) to develop better solutions, each successive generation of solutions being as good as or better than the one before it. This process continues until the stopping criteria is met (a solution is produced with optimum fitness value=1 or after 100 generations). A sample chromosome, which represents a flight path, is shown in FIG. 5.

Figures 4, 5, 6:
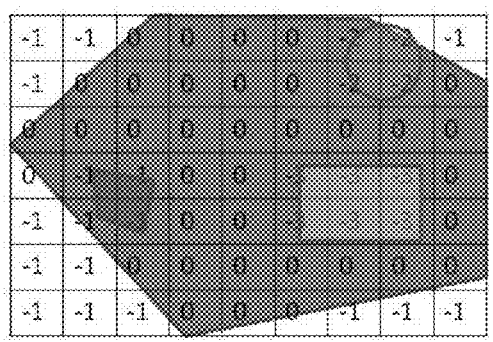
FIG. 4 illustrates where labeling has been applied to each region of the grid.
FIG. 5 illustrates a sample chromosome that represents the flight path of a UAV. Each entry in the chromosome is referred to as a gene.
FIG. 6 illustrates sample patterns for visiting cells. P1 is pattern 1 and P2 is pattern 2. A UAV at a given cell visits the surrounding cells in the order of priority given in the matrices. For example, if a UAV is following P1, then the UAV visits the cell above first. If the cell above is unavailable, then the UAV visits the cell to the right; if it is unavailable, then the UAV visits the cell below, etc.

The initial generation of chromosomes contains eight chromosomes that represent the standard patterns for visiting cells for this coverage type of problem (FIG. 6). The other 92 chromosomes are developed from these original eight chromosomes by mutating (or changing one gene). After the initial population is created then each chromosome is evaluated by the fitness function. The chromosome in FIG. 5 follows pattern 2. This means that at whatever cell the quadcopter starts in on the grid, it goes right 3 times (2,2,2) then from there it goes up one cell (3), then left 3 times (4,4,4), then up 3 times (3,3,3), etc.

Figure 7:
FIG. 7 illustrates a Uniform Crossover.

To create the next generation of 100 chromosomes (possible solutions) a mutation of approximately 50% of the original chromosomes is completed to form new chromosomes and additional new chromosomes are developed through crossover of pairs of chromosomes with the highest fitness values. If the chromosome is chosen to be mutated then one gene (number in the chromosome) is randomly selected to be changed. There is 50/50 chance of the chromosome being mutated and added to the new set of chromosomes. A Uniform Crossover is used to combine a chromosome with a high fitness value and another random chromosome with the same length. The Uniform Crossover (FIG. 7) enables the two parent chromosomes to contribute the genes about evenly. If the mixing ratio is 0.5, the offspring has approximately half of the genes from first parent and the other half from second parent, although cross over points can be randomly chosen as seen in FIG. 7.

After these two operations are completed and the new chromosomes added to the original 100 chromosomes, the total set of chromosomes will be ordered by their fitness values and the best 100 chromosomes will be kept. Then the process starts all over again and continues until either one of the chromosomes has fitness 1 or 100 iterations is completed. When one of the stopping criteria has been met, then the algorithm will output an optimal path (the best one found) for visiting the open regions of the area.

Figure 8:
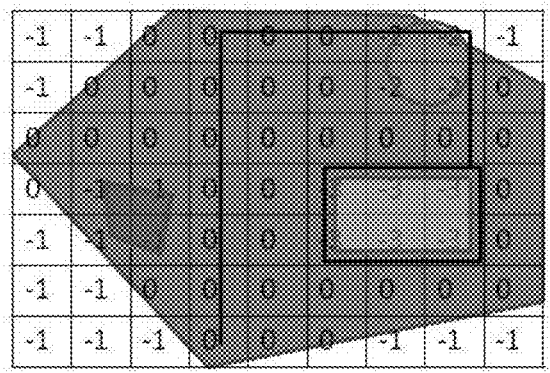
FIG. 8 illustrates a flight path following pattern 1. When the path reaches a region adjacent to a region with a −3, then the structure (or "special") mapping flight path is appended.

The next step is to append the structure (or "special") mapping flight path to the area mapping flight path. The optimal chromosome is applied to the area map that has been overlaid with the labeled grid. When the path moves to a grid region that is adjacent to a region marked with a −3 (structure), then the path will be appended with a structure mapping flight path as shown in FIG. 8.

To create the structure mapping flight path, an offset distance is chosen and the quadcopter will fly at that distance from the structure. A path is created that surrounds the structure at the distance of the offset away. The structure flight path is segmented using distinct points along the path to be used as waypoints for the quadcopter. A list of waypoints is recorded along with altitude, camera angle, and heading for each point. This information is used to ensure the camera is always facing the structure at the proper angle. The structure mapping flight path always begins and ends at the same location. Once the structure mapping flight path is appended to the area mapping flight path at the proper location, the area mapping algorithm continues on with the original optimal path from the point of departure. When the mapping of the area is completed, then the quadcopter is directed to the take-off/landing position to land.

CONCLUSION

While various preferred embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above.

What is claimed is:

1. A method for generating an unmanned aerial vehicle (UAV) flight plan for an area to be mapped, comprising:
   identifying the area to be mapped;
   identifying special regions within the area to be mapped; and
   applying a rule set using a controller for generating an optimized flight plan to be implemented at a later time by a UAV, wherein the flight plan is optimized for 3D mapping and modeling.

2. The method of claim 1, further comprising integrating flight patterns from different regions of the area to be mapped to generate an optimized flight plan for the area to be mapped.

3. The method of claim 1, wherein applying a rule set comprises integrating rule sets for different special regions to generate an optimized flight plan for the area to be mapped.

4. The method of claim 1, wherein the special regions comprise manmade and natural structures, water, snow, fields, vegetation, forests, fields, rivers and streams, urban areas, sparsely populated areas, stationary vehicles, power towers, communications towers, satellite tracking stations, bridges and dams, oil rigs and offshore structures, wind turbines, historical sites, and avoidance areas.

5. The method of claim 1, wherein each special region has a rule set for the region, each of which has specific patterns, and applying the rule set comprises integrating the specific patterns into an optimal flight path.

6. An automatic unmanned aerial vehicle (UAV) flight control system for 3D aerial mapping, the system comprising: a UAV with an onboard camera; a controller capable of communication with a flight control module of the UAV, the controller configured to: determine an area mapping flight path based on terrain characteristics of an area to be mapped; determine a structure mapping flight path based on the existence and location of vertical structures within the area to be mapped; and determine an optimized flight path for the UAV by integrating the area mapping flight path and the structure mapping flight path, wherein the UAV flight path is optimized for 3D mapping and modeling of an area to be mapped, and the optimized UAV flight path is implemented at a later time by a UAV.

7. The system according to claim 6, wherein the controller is further configured to capture images of the area to be mapped.

8. The system according to claim 6, wherein the controller is further configured to identify an area to be mapped by selecting corner points for the area and constructing a convex hull using the corner points.

9. The system according to claim 6, wherein the controller is further configured to determine whether there are avoidance areas within the area to be mapped.

10. The system according to claim 6, wherein the controller is further configured to identify structures to be mapped that are located within the area to be mapped.

11. The system according to claim 6, wherein the controller is further configured to identify locations from which images are to be captured in order to prepare a 3D map of the area to be mapped.

12. The system according to claim 6, wherein the controller is further configured to apply an optimization algorithm to determine an optimal area mapping flight path for the UAV.

13. The system according to claim 6, wherein the controller is further configured to integrate area mapping flight path information, structure mapping flight path, and avoidance area information to generate an optimized UAV flight plan.

14. The system according to claim 6, wherein the controller is further configured for desired flight parameters, which include one or more of a total flight time, available UAV power, a noise limitation, or a user defined restriction.

15. The system according to claim 6, wherein the controller is part of a remote computing device and is further configured to communicate with the flight control module of the UAV via wireless means.

16. A non-transitory computer-readable storage medium with instructions stored thereon to control a flight path of an unmanned aerial vehicle (UAV) based image capture system for 3D modeling, the instructions comprising: determining an initial movement path based on an area to be mapped, the existence of vertical structures and avoidance areas within the area to be mapped; capturing images of the area and structures to be mapped; and guiding the UAV flight path, wherein the UAV flight path is optimized for 3D mapping and modeling of an area to be mapped, and the optimized UAV flight path is implemented at a later time by a UAV.

17. The non-transitory computer-readable storage medium according to claim 16, wherein the instructions are generated by applying an optimization algorithm.

* * * * *